(12) United States Patent
Takahashi et al.

(10) Patent No.: US 10,047,219 B2
(45) Date of Patent: Aug. 14, 2018

(54) POLYOLEFIN-BASED RESIN COMPOSITION

(75) Inventors: Katsunori Takahashi, Shimamoto-cho (JP); Daisuke Mukohata, Shimamoto-cho (JP); Mitsuru Naruta, Shimamoto-cho (JP); Kouji Taniguchi, Shimamoto-cho (JP); Naoyuki Nagatani, Shimamoto-cho (JP); Shouji Nozato, Shimamoto-cho (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 13/703,755

(22) PCT Filed: Jun. 16, 2011

(86) PCT No.: PCT/JP2011/063813
§ 371 (c)(1),
(2), (4) Date: Jan. 3, 2013

(87) PCT Pub. No.: WO2011/158906
PCT Pub. Date: Dec. 22, 2011

(65) Prior Publication Data
US 2013/0096247 A1    Apr. 18, 2013

(30) Foreign Application Priority Data

Jun. 16, 2010 (JP) ................. 2010-136706
Sep. 24, 2010 (JP) ................. 2010-213541

(51) Int. Cl.
| | |
|---|---|
| *C08L 23/26* | (2006.01) |
| *C08K 3/04* | (2006.01) |
| *C08L 47/00* | (2006.01) |
| *C08L 53/00* | (2006.01) |
| *C08L 51/06* | (2006.01) |

(52) U.S. Cl.
CPC ............. *C08L 23/26* (2013.01); *C08K 3/04* (2013.01); *C08L 47/00* (2013.01); *C08L 51/06* (2013.01); *C08L 53/00* (2013.01)

(58) Field of Classification Search
CPC .......... C08L 23/06; C08L 47/00; C08L 53/00; C08L 23/26; C08L 51/06; C08K 3/04
USPC ................... 524/495, 525, 505, 528, 576
See application file for complete search history.

(56) References Cited

U.S. PATENT DOCUMENTS

| | | | | |
|---|---|---|---|---|
| 2002/0054995 | A1* | 5/2002 | Mazurkiewicz | B02C 19/06 428/364 |
| 2006/0027790 | A1* | 2/2006 | Arai | H01B 1/24 252/500 |
| 2008/0009580 | A1* | 1/2008 | Sugawara et al. | 524/496 |
| 2008/0110429 | A1* | 5/2008 | Sugawara et al. | 123/184.61 |
| 2008/0149363 | A1  | 6/2008 | Han et al. | |
| 2009/0088354 | A1  | 4/2009 | Berry et al. | |
| 2010/0055458 | A1* | 3/2010 | Jang et al. | 428/402 |
| 2010/0233400 | A1  | 9/2010 | Sano | |

FOREIGN PATENT DOCUMENTS

| | | | |
|---|---|---|---|
| JP | 58171426 A | * | 10/1983 |
| JP | 03091547 A | * | 4/1991 |
| JP | 4-159342 | | 6/1992 |
| JP | 07166003 A | * | 6/1995 |
| JP | 2004-47146 | | 2/2004 |
| JP | 2004-182826 | | 7/2004 |
| JP | 2005-264059 | | 9/2005 |
| JP | 2005-281466 | | 10/2005 |
| JP | 2007-100027 | | 4/2007 |
| JP | 2007-103297 | | 4/2007 |
| JP | 2007-327027 | | 12/2007 |
| JP | 2009-199794 | | 9/2009 |
| JP | 2010-506013 | | 2/2010 |
| WO | 2008/130431 | | 10/2008 |
| WO | 2009/123771 | | 10/2009 |

OTHER PUBLICATIONS

JP 07-166003 A (1995), machine translation, JPO J-PlatPat (Japan Platform for Patent Information).*
JP 58-171426 A (1983), machine translation, JPO Japan Platform for Patent Information (J-PlatPat).*
JP 03-091547 A (1991), machine translation, JPO Japan Platform for Patent Information (J-PlatPat).*
Shen et al.,Tawari, A. Ed., Innovative Graphene Technologies—Developments and Characterisation, vol. 1, Section 2.3.2 "Dispersions of Graphene-135 in Solvents", pp. 23-24, Smithers Rapra Technology. (Year: 2013).*
Supplementary European Search report dated Nov. 15, 2013 in European Application No. 11 79 5808.
International Search Report dated Sep. 20, 2011 in International (PCT) Application No. PCT/JP2011/063813.
English translation of Office Action dated Mar. 24, 2014 in Chinese Application No. 201180029068.7.
Office Action dated Mar. 24, 2014 in Chinese Application No. 201180029068.7.
Zhang, "Preparation and characterization of nanocomposite based on graphite oxide and polymer thereof", China Academic Journals Full-text Database, Oct. 15, 2009, pp. 36, 39 and 42, with English abstract.

* cited by examiner

*Primary Examiner* — Josephine L Chang
(74) *Attorney, Agent, or Firm* — Wenderoth, Lind & Ponack, L.L.P.

(57) ABSTRACT

Provided is a polyolefin-based resin composition capable of obtaining a molded product having a high modulus of elongation and a low coefficient of linear expansion. The polyolefin-based resin composition includes a polyolefin-based resin containing either one or both of an acid-modified polyolefin-based resin and a polyolefin-based resin with a hydroxyl group, and flaked graphite. The flaked graphite is uniformly dispersed in the polyolefin-based resin. As a result, a molded product formed by using the polyolefin-based resin composition has excellent mechanical strength such as a high modulus of elongation, a low coefficient of linear expansion, and high dimensional stability, and can be used for various applications such as a material that is suitable for use as the exterior panels of automobiles or a steel sheet replacement material.

6 Claims, No Drawings

POLYOLEFIN-BASED RESIN COMPOSITION

TECHNICAL FIELD

The present invention relates to a polyolefin-based resin composition.

BACKGROUND ART

Flaked graphite has recently attracted attention as a substance having a carbon skeleton and high shape anisotropy. Flaked graphite is obtained by separating graphene sheets from graphite. Due to its high hardness, flaked graphite can be expected to act as a reinforcing material when mixed with a synthetic resin. Graphene sheets are separated from graphite multiple times to provide the flaked graphite having a high specific surface area. Therefore, the amount of flaked graphite required to be added can be decreased. This may minimize various risks usually associated with a synthetic resin containing flaked graphite, such as increased specific gravity and loss of brittleness. Furthermore, flaked graphite is also expected to affect the expression of various functions. For this reason, flaked graphite has been widely studied in various fields.

In contrast, polyolefin-based resins can be easily handled from the viewpoint of moldability, cost of distribution and impact on the environment, and have been used widely. However, polyolefin-based resins often do not have the mechanical and physical properties required for various applications. In order to obtain a polyolefin-based resin composition having excellent mechanical and physical properties such as rigidity, strength, and shock resistance, a variety of studies have been undertaken.

For example, in order to provide a resin composition having excellent mechanical and physical properties such as rigidity and shock resistance and excellent moldability, Patent Literature 1 discloses a resin composition containing a fibrous filler having an average particle diameter of 0.1 to 30 μm and an aspect ratio of 20 to 80, an inorganic nanofiller having an average particle diameter of 300 nm or less, and a polypropylene resin.

Further to this, examples detailed in Patent Document 1 describe a composition containing polypropylene, fine nanoscale silica particles, and glass fibers, where the composition has excellent moldability and good surface appearance, and the bending modulus and the impact test results are both improved. Moreover, Patent Literature 1 describes that the resin composition can be used for the exterior panels of automobiles. However, Patent Literature 1 does not describe significant physical values such as the modulus of elongation and coefficient of linear expansion of the resin composition.

The resin composition described above contains a fibrous filler, and the fibrous filler has the disadvantage of being difficult to handle. In addition, a molded product formed using the resin composition displays surface deterioration.

CITATION LIST

Patent Literature

Patent Literature 1: Japanese Patent Application Laid-Open No. 2004-182826

SUMMARY OF INVENTION

Technical Problem

The present invention provides a polyolefin-based resin composition capable of providing a molded product having a high modulus of elongation and a low coefficient of linear expansion.

Solution to Problem

A polyolefin-based resin composition of the present invention includes a polyolefin-based resin containing either one or both of an acid-modified polyolefin-based resin and a polyolefin-based resin with a hydroxyl group, and flaked graphite.

The type of acid-modified polyolefin-based resin to be used is not particularly limited, however, an unsaturated carboxylic acid-modified polyolefin-based resin obtained by modifying a polyolefin-based resin with unsaturated carboxylic acid is preferable. The acid-modified polyolefin-based resin may be used alone or two or more kinds thereof may be used in combination. Examples of the unsaturated carboxylic acid may include acrylic acid, methacrylic acid, crotonic acid, maleic acid, cinnamic acid, itaconic acid, citraconic acid, fumaric acid, and unsaturated carboxylic anhydrides such as maleic anhydride, itaconic anhydride, and citraconic anhydride. Maleic acid is preferable as the unsaturated carboxylic acid and maleic anhydride is preferable as the unsaturated carboxylic anhydride.

Examples of the unsaturated carboxylic acid-modified polyolefin-based resin may include maleic acid-modified ethylene oligomers such as maleic anhydride-modified ethylene oligomers; an unsaturated carboxylic acid-modified polyethylene-based resin including an ethylene-acrylic acid copolymer, an ethylene-methacrylic acid copolymer, an ethylene-acrylate copolymer, an ethylene-methacrylate copolymer, and maleic acid-modified polyethylene such as a maleic anhydride-modified polyethylene; maleic acid-modified propylene oligomers such as maleic anhydride-modified propylene oligomers; and an unsaturated carboxylic acid-modified polypropylene-based resin including a propylene-acrylic acid copolymer, a propylene-methacrylic acid copolymer, a propylene-acrylate copolymer, a propylene-methacrylate copolymer, and a maleic acid-modified polypropylene such as a maleic anhydride-modified polypropylene. A maleic acid-modified polyolefin-based resin such as a maleic acid-modified polyethylene-based resin and a maleic acid-modified polypropylene-based resin is preferable, and a maleic anhydride-modified polyolefin-based resin such as a maleic anhydride-modified polyethylene-based resin and a maleic anhydride-modified polypropylene-based resin is more preferable. A maleic acid-modified polyethylene-based resin is obtained by graft polymerization of maleic acid to a polyethylene-based resin. A maleic acid-modified polypropylene-based resin is obtained by graft polymerization of maleic acid to a polypropylene-based resin.

The polyolefin-based resin is a synthetic resin obtained by polymerization or copolymerization of an olefin-based monomer having a radical-polymerizable unsaturated double bond. The type of olefin-based monomer to be used is not particularly limited, and examples thereof may include α-olefins such as ethylene, propylene, 1-butene, 1-pentene, 1-hexene, 1-heptene, 1-octene, and 4-methyl-1-pentene, and conjugated dienes such as butadiene and isoprene. The olefin-based monomer may be used alone or two or more kinds thereof may be used in combination.

The type of polyolefin-based resin to be used is also not particularly limited, and examples thereof may include a polyethylene-based resin such as homopolymers of ethylene and copolymers of ethylene and α-olefins, other than ethylene, in which the ethylene component exceeds 50% by weight, a polypropylene-based resin such as homopolymers of propylene and copolymers of propylene and α-olefins, other than propylene, in which the propylene component exceeds 50% by weight, homopolymers of butene, and homopolymers or copolymers of conjugated dienes such as butadiene and isoprene. Homopolymers of propylene, and copolymers of propylene and α-olefins, other than propylene, in which the propylene component exceeds 50% by weight, are preferable. The polyolefin-based resin may be used alone or two or more kinds thereof may be used in combination.

It is preferable that the acid-modified polyolefin-based resin contain a component containing a polar group other than the acid group introduced by the acid modification and a non-polar component. In the acid-modified polyolefin-based resin, the component containing a polar group and the non-polar component may be subjected to copolymerization to form a main chain, or the component containing a polar group may be grafted to the main chain of the non-polar component. In the acid-modified polyolefin-based resin, the component containing a polar group and the non-polar component may be regular or irregular. The type of polar group to be used is not particularly limited, and examples thereof may include an alkoxy group, an epoxy group, a carboxyl group, a hydroxyl group, a maleic anhydride group, an isocyanate group, and an aldehyde group.

When the weight average molecular weight of the acid-modified polyolefin-based resin is small, its viscosity during melting is low and the polyolefin-based resin composition may be difficult to handle. When it is large, the ability of the acid-modified polyolefin-based resin to disperse additives disappears. For this reason, the acid-modified polyolefin-based resin is unlikely to exist effectively near flaked graphite, and the effect of the acid-modified polyolefin-based resin to stably disperse flaked graphite may be decreased. Therefore, the weight average molecular weight of the acid-modified polyolefin-based resin is preferably 1,000 to 500,000, more preferably 1,000 to 200,000, and particularly preferably 1,000 to 50,000. The weight average molecular weight of the acid-modified polyolefin-based resin is a molecular weight determined with respect to polystyrene and is measured by a high temperature GPC system.

When the acid value of the acid-modified polyolefin-based resin is small, the interaction of the acid-modified polyolefin-based resin with flaked graphite is small, and the effect of the acid-modified polyolefin-based resin to stably disperse flaked graphite may be decreased. When the acid value is large, the mechanical strength of the polyolefin-based resin composition is decreased due to the decrease in crystallinity of the acid-modified polyolefin-based resin, or the compatibility of the acid-modified polyolefin-based resin with polyolefin-based resin other than the acid-modified polyolefin-based resin is decreased. Thus, the effect of the acid-modified polyolefin-based resin to stably disperse the flaked graphite may be decreased. Therefore, the acid value of the acid-modified polyolefin-based resin is preferably 0.5 to 200, and more preferably 3 to 100. The acid value of the acid-modified polyolefin-based resin is a value measured in accordance with JIS K0070.

The acid-modified polyolefin-based resin has the effect of stabilizing flaked graphite as is by the interaction of the acid group moiety introduced by the modification with the electron cloud between the graphene sheets of the flaked graphite. Therefore, the flaked graphite cannot aggregate in the polyolefin-based resin and is instead uniformly dispersed. Further to this, the acid-modified polyolefin-based resin has excellent compatibility with the other polyolefin-based resin. Even when the other polyolefin-based resin is contained in the polyolefin-based resin, the acid-modified polyolefin-based resin is uniformly dispersed in the polyolefin-based resin. Due to the acid-modified polyolefin-based resin being dispersed uniformly throughout the polyolefin-based resin, the flaked graphite cannot aggregate and is instead also uniformly dispersed.

The acid-modified polyolefin-based resin can be selected from products available on the market. The "Umex" series available from Sanyo Chemical Industries, Ltd. can be used as the maleic acid-modified polypropylene-based resin, the "CB polymer" series available from Kuraray Co., Ltd. can be used as the carboxylic acid-modified polypropylene-based resin, and the "Admer" series available from Mitsui Chemicals, Inc. can be used as the maleic anhydride-modified polypropylene-based resin.

The acid-modified polyolefin-based resin is preferably used with flaked graphite having an oxygen content of 3 atm % or more, more preferably with flaked graphite having an oxygen content of 3 to 20 atm %, particularly preferably with flaked graphite having an oxygen content of 10 atm % or more, and most preferably with flaked graphite having an oxygen content of 10 to 20 atm %. The flaked graphite having an oxygen content of 3 atm % or more often has a polar group such as a carboxyl group and an epoxy group on the surface thereof. Therefore, the flaked graphite can be stabilized as is by the interaction of the acid group moiety of the acid-modified polyolefin-based resin with the polar group of the flaked graphite. The flaked graphite cannot aggregate and is instead uniformly dispersed in the polyolefin-based resin composition. The oxygen content of the flaked graphite can be measured by ESCA.

When the content of the acid-modified polyolefin-based resin in the polyolefin-based resin is small, the dispersibility of the flaked graphite within the polyolefin-based resin composition is low and the flaked graphite may aggregate. Therefore, the content of the acid-modified polyolefin-based resin in the polyolefin-based resin is preferably 1% by weight or more, more preferably 1 to 100% by weight, and particularly preferably 1 to 10% by weight.

Examples of the polyolefin-based resin with a hydroxyl group may include a polyolefin-based resin having a terminal hydroxyl group. Hereinafter, the description of the polyolefin-based resin is omitted since it is the same as that described above. For example, a conjugated diene monomer is polymerized using known methods such as anion polymerization, and the resulting polymer is hydrolyzed and hydrogenated to obtain the polyolefin-based resin with a terminal hydroxyl group. For the polyolefin-based resin with a hydroxyl group, "POLYTAIL H" (trade name) is available from Mitsubishi Chemical Corporation.

The polyolefin-based resin with a hydroxyl group is preferably used with flaked graphite having an oxygen content of 3 atm % or more, more preferably with flaked graphite having an oxygen content of 3 to 20 atm %, particularly preferably with flaked graphite having an oxygen content of 10 atm % or more, and most preferably with flaked graphite having an oxygen content of 10 to 20 atm %. The flaked graphite having an oxygen content of 3 atm % or more often has a polar group such as a carboxyl group or an epoxy group on the surface thereof. Therefore, the flaked graphite can be stabilized as is by the interaction of the polar group of the flaked graphite with the hydroxyl group moiety of the polyolefin-based resin with a hydroxyl group. The flaked graphite cannot aggregate and is instead uniformly dispersed in the polyolefin-based resin composition. The oxygen content of the flaked graphite can be measured by ESCA.

When the hydroxyl value of the polyolefin-based resin with a hydroxyl group is small, the interaction of the polyolefin-based resin with a hydroxyl group with the flaked graphite is small, and the effect of the resin to stably disperse the flaked graphite may be decreased. When it is large, the decreased crystallinity of the polyolefin-based resin with a hydroxyl group may decrease the mechanical strength of the polyolefin-based resin composition. Therefore, the hydroxyl value of the polyolefin-based resin with a hydroxyl group is preferably 0.5 to 200, and more preferably 3 to 100. The hydroxyl value is measured in accordance with JIS K1557.

When the weight average molecular weight of the polyolefin-based resin with a hydroxyl group is small, its viscosity during melting is low and the polyolefin-based resin composition may be difficult to handle. When it is large, the ability of the polyolefin-based resin with a hydroxyl group to disperse additives disappears. For this reason, the polyolefin-based resin with a hydroxyl group is unlikely to exist effectively near flaked graphite, and the effect of the polyolefin-based resin with a hydroxyl group to stably disperse the flaked graphite may be decreased. Therefore, the weight average molecular weight of the polyolefin-based resin with a hydroxyl group is preferably 1,000 to 50,000. The weight average molecular weight of the polyolefin-based resin with a hydroxyl group is a molecular weight determined with respect to polystyrene and is measured using a high temperature GPC system.

When the content of the polyolefin-based resin with a hydroxyl group in the polyolefin-based resin is small, the dispersibility of the flaked graphite within the polyolefin-based resin composition is low and the flaked graphite may aggregate. Therefore, the content of the polyolefin-based resin with a hydroxyl group in the polyolefin-based resin is preferably 1% by weight or more, more preferably 1 to 100% by weight, and particularly preferably 1 to 10% by weight.

When the total content of the acid-modified polyolefin-based resin and the polyolefin-based resin with a hydroxyl group in the polyolefin-based resin containing the acid-modified polyolefin-based resin and the polyolefin-based resin with a hydroxyl group is small, the dispersibility of flaked graphite in the polyolefin-based resin composition is low and the flaked graphite may aggregate. Therefore, the total content as described above is preferably 1% by weight or more, more preferably 1 to 100% by weight, and particularly preferably 1 to 10% by weight.

The polyolefin-based resin may contain a polyolefin-based resin other than the acid-modified polyolefin-based resin and the polyolefin-based resin with a hydroxyl group. The polyolefin-based resin is a synthetic resin obtained by polymerization or copolymerization of olefin-based monomers having a radical-polymerizable double bond. The type of olefin-based monomer to be used is not particularly limited, and examples thereof may include $\alpha$-olefins such as ethylene, propylene, 1-butene, 1-pentene, 1-hexene, 1-heptene, 1-octene, and 4-methyl-1-pentene, and conjugated dienes such as butadiene and isoprene. The olefin-based monomer may be used alone or two or more kinds thereof may be used.

The type of polyolefin-based resin to be used is not particularly limited, and examples thereof may include a polyethylene-based resin such as homopolymers of ethylene and copolymers of ethylene and $\alpha$-olefins, other than ethylene, in which the ethylene component exceeds 50% by weight, a polypropylene-based resin such as homopolymers of propylene and copolymers of propylene and $\alpha$-olefins, other than propylene, in which the propylene component exceeds 50% by weight, homopolymers of butene, and homopolymers or copolymers of conjugated dienes such as butadiene and isoprene. Homopolymers of propylene and copolymers of propylene and $\alpha$-olefins, other than propylene, in which the propylene component exceeds 50% by weight, are preferable. The polyolefin-based resin may be used alone or two or more kinds thereof may be used in combination.

The flaked graphite is obtained by flaking off graphene sheets from a graphite compound. The flaked graphite is a layered body of a plurality of graphene sheets. Since graphene sheets are flaked off from the graphite compound to obtain the flaked graphite, the flaked graphite is the layered body of graphene sheets which is thinner than the graphite compound to be used as the raw material, that is, the flaked graphite is a layered body of graphene sheets having fewer layers than the number of layers of graphene sheets that make up the graphite compound as a raw material. In the present invention, the graphene sheet is a sheet-shaped substance composed of a carbon hexagonal net plane. The graphite compound may be graphite or an oxidized graphite such as expanded graphite. An oxidized graphite such as expanded graphite is preferable, and expanded graphite is more preferable. The graphene sheets are easily flaked off from the oxidized graphite. Further, a functional group may be bonded with the graphite chemically or artificially through weak interactions.

It is preferable that the graphite be graphite having a single multi-layer structure as a whole particle. Examples of the graphite may include natural graphite, kish graphite, and high orientation thermal decomposition graphite. The natural graphite and kish graphite are a single crystal of graphene sheets (forming a basic layer) each having roughly one crystal direction or an assembly thereof. The high orientation thermal decomposition graphite is an assembly of many small crystals of graphene sheets (forming a basic layer) having different crystal directions.

The type of method used for flaking off graphene sheets from a graphite compound is not particularly limited, and examples thereof may include (1) the Hummers-Offeman method (W. S. Hummers et al., J. Am. Chem. Soc., 80, 1339(1958)) in accordance with Japanese Patent Application Laid-Open No. 2002-53313, (2) a method for flaking off graphene sheets from graphite oxide formed by a method described in U.S. Pat. No. 2,798,878 followed by purification, (3) a method for flaking off graphene sheets from a graphite oxide intercalation compound through rapid heating as described in Japanese Translation of PCT Application No. 2009-511415, and (4) a method for flaking off graphene sheets from a graphite compound through exposure of the graphite compound to a high-pressure fluid such as a supercritical fluid and a sub-critical fluid.

The supercritical fluid is a fluid at a temperature equal to or higher than the temperature of its critical point (critical temperature Tc) and a pressure equal to or higher than the pressure of its critical point (critical pressure Pc). The sub-critical fluid is a fluid at a temperature and pressure near or slightly lower than those of its critical point.

When the mean size of flaked graphite in the plane direction of a graphene sheet is short, the aspect ratio of flaked graphite is small. As a result, the total surface area of the flaked graphite added to the polyolefin-based resin composition is decreased, and advantages obtained due to the flaked graphite being contained therein may be decreased. When the mean size is large, the flaked graphite is likely to aggregate within the resin. Or alternatively, when gaps are generated between the polyolefin-based resin and the flaked graphite, the gaps may be enlarged. Therefore, the mean size of flaked graphite in the plane direction of a graphene sheet is preferably 0.05 to 20 μm, more preferably 0.05 to 10 μm, and particularly preferably 0.05 to 6 μm.

The size of flaked graphite in the plane direction of a graphene sheet is the maximum size of the flaked graphite seen from a direction in which the area of the flaked graphite is largest. The size of flaked graphite in the plane direction of a graphene sheet is a value measured by SEM. The mean size of flaked graphite in the plane direction of a graphene sheet is an arithmetic mean size of each flaked graphite in the plane direction of graphene sheet.

The number of layers of a graphene sheet of flaked graphite is preferably 300 or less, more preferably 200 or less, and particularly preferably 90 or less. The number of layers of graphene sheets of flaked graphite can be observed by a transmission electron microscope (TEM), and is an arithmetic mean of the number of layers of graphene sheet of each flaked graphite.

In order to adjust the carbon content or the oxygen content of the flaked graphite, the flaked graphite may be reduced. Examples of reducing the flaked graphite may include a method for exposing flaked graphite to a reducing agent and a method for heating flaked graphite. Examples of the reducing agent include hydrazine, dimethyl hydrazine, and diethyl hydroxylamine. The reducing agent may be used alone or two or more kinds thereof may be used in combination.

When the content of flaked graphite in the polyolefin-based resin composition is small, the mechanical strength of a molded product formed using the polyolefin-based resin composition may be decreased. When the content of flaked graphite is large, the toughness and moldability of the polyolefin-based resin composition may be decreased. Therefore, the content of flaked graphite in the polyolefin-based resin composition is preferably 0.5 to 50 parts by weight, and more preferably 1 to 10 parts by weight, relative to 100 parts by weight of the polyolefin-based resin.

In order to uniformly disperse flaked graphite in the polyolefin-based resin, either one or both of a compound with a six-membered ring and a compound with a five-membered ring may be contained in the polyolefin-based resin composition if necessary. In the compound with a six-membered ring or the compound with a five-membered ring, the six-membered ring or five-membered ring moiety is tightly adsorbed or bonded to the flaked graphite, and any residual structure moiety is dissolved in the polyolefin-based resin. Thus, the flaked graphite can be uniformly dispersed in the polyolefin-based resin.

The type of compound with a six-membered ring to be used is not limited as long as it has a six-membered ring. The compound is preferably a compound with a benzene ring, more preferably a polymer with a benzene ring, particularly preferably a polymer containing a styrene component, and most preferably a styrene-olefin copolymer or a styrene-diene copolymer. Further, a styrene-olefin copolymer is more preferable than a styrene-diene copolymer. This is because the styrene-olefin copolymer has excellent compatibility with the polyolefin-based resin, allows flaked graphite to be uniformly dispersed in the polyolefin-based resin, and can improve brittleness thereby enhancing the mechanical strength of the polyolefin-based resin composition. It is preferable that the styrene-olefin copolymer be a styrene-based thermoplastic elastomer such as a styrene-ethylene/propylene block copolymer, a styrene-ethylene/propylene-styrene block copolymer, a styrene-ethylene/butylene-styrene block copolymer, or a styrene-(ethylene-ethylene/propylene)-styrene block copolymer. It is preferable that the styrene-diene copolymer be a styrene-based thermoplastic elastomer such as a styrene-butadiene-styrene block copolymer. The compound with a six-membered ring may be used alone or two or more kinds thereof may be used in combination. For the compound with a six-membered ring, "Septon" (trade name) is available from Kuraray Co., Ltd., "Tuftec" (trade name) is available from Asahi Kasei Corporation, "Rabalon" (trade name) is available from Mitsubishi Chemical Corporation, and "Kraton" (trade name) is available from Ktaton Polymer.

When the content of the styrene component in the polymer containing a styrene component is large, the styrene components of the polymer containing a styrene component interact with each other in the polyolefin-based resin to form an aggregate of the polymer containing a styrene component. As a result, mechanical and physical properties such as the modulus of elongation and the coefficient of linear expansion of the polyolefin-based resin composition may be decreased. Therefore, the content of the styrene component in the polymer containing a styrene component is preferably 40% by weight or less, and more preferably 30% by weight or less. When the content of the styrene component in the polymer containing a styrene component is small, the six-membered ring moiety of the polymer containing a styrene component cannot be sufficiently adsorbed or bonded to the flaked graphite, and the flaked graphite may not be uniformly dispersed in the polyolefin-based resin. Therefore, the content of the styrene component in the polymer containing a styrene component is preferably 3% by weight or more, and more preferably 5% by weight or more.

The compound with a six-membered ring can be used particularly in combination with flaked graphite having a large carbon content, preferably flaked graphite having a carbon content of 80 atm % or more, and more preferably flaked graphite having a carbon content of 90 atm % or more. The flaked graphite having a large carbon content is rich in the flat SP2 network, and therefore is likely to interact with the compound with a six-membered ring in the graphene sheet. Thus, the flaked graphite cannot aggregate in the polyolefin-based resin composition and can be uniformly dispersed in a stable state. The carbon content of the flaked graphite can be measured by ESCA.

The type of compound with a five-membered ring to be used is not particularly limited as long as it has a five-membered ring, and examples thereof may include tetrahydrofuran, N-methylpyrrolidone, 3-hexylthiophene, 3-dodecylthiophen, hexylpyrrole, dodecylpyrrole, hexylthiol, dodecanethiol, a compound having a structural formula represented by the formula 1, poly(3-hexylthiophene), poly(3-pentadecylpyrrole), polyhexylaniline, polyvinylpyrrolidone, or a polymer having a structural formula represented by the formula 2.

[Formula 1]

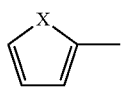
(1)

[Formula 2]

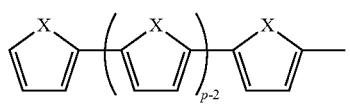
(2)

In the formula 1, X represents S, NH, or O. In the formula 2, the Xs are each independently S, NH, or O, and p is an integer in the range of 2 to 60.

When the polyolefin-based resin composition contains the compound with a six-membered ring and the content of the compound with a six-membered ring in the polyolefin-based resin is small, the dispersibility of flaked graphite may be decreased. When it is large, the physical properties of the polyolefin-based resin may deteriorate. Therefore, the content of the compound with a six-membered ring in the polyolefin-based resin is preferably 0.5 to 30 parts by weight, and more preferably 1 to 10 parts by weight, relative to 100 parts by weight of the polyolefin-based resin.

When the polyolefin-based resin composition contains the compound with a five-membered ring and the content of the compound with a five-membered ring in the polyolefin-based resin is small, the dispersibility of flaked graphite may also be decreased. When it is large, the physical properties of the polyolefin-based resin may deteriorate. Therefore, the content of the compound with a five-membered ring in the polyolefin-based resin is preferably 0.5 to 30 parts by weight, and more preferably 1 to 10 parts by weight, relative to 100 parts by weight of the polyolefin-based resin.

When the polyolefin-based resin composition contains the compound with a six-membered ring and the compound with a five-membered ring and the total content of the compounds in the polyolefin-based resin is small, the dispersibility of flaked graphite may be decreased. When it is large, the physical properties of the polyolefin-based resin may deteriorate. Therefore, the total content of the compound with a six-membered ring and the compound with a five-membered ring in the polyolefin-based resin is preferably 0.5 to 30 parts by weight, and more preferably 1 to 10 parts by weight, relative to 100 parts by weight of the polyolefin-based resin.

Further, the polyolefin-based resin composition may contain a coloring agent such as a pigment or a dye, an antioxidant, a light stabilizer, a thermal stabilizer, and a lubricant within a range that does not deteriorate the physical properties of such.

The type of method used for producing the polyolefin-based resin composition is not particularly limited, and examples thereof may include a method in which a polyolefin-based resin containing either one or both of an acid-modified polyolefin-based resin and a polyolefin-based resin with a hydroxyl group, flaked graphite, and if necessary, either one or both of a compound with a six-membered ring and a compound with a five-membered ring are supplied to an extruder and melted and kneaded.

The polyolefin-based resin composition is extruded in a sheet configuration from the extruder, and if necessary, laminated and bonded with another sheet and the layered body is molded into a desired shape by a general molding method such as press molding to obtain a molded product having the desired shape with ease.

The molded product has excellent mechanical strength such as a high modulus of elongation, a low coefficient of linear expansion, and high dimensional stability. Therefore, the molded product can be used as a material that is suitable for use as the exterior panels of automobiles or as a sheet metal replacement material.

Advantageous Effects of Invention

The polyolefin-based resin composition of the present invention has the structure described above. Flaked graphite is uniformly dispersed in a polyolefin-based resin. As a result, a molded product formed by using the polyolefin-based resin composition has excellent mechanical strength such as a high modulus of elongation, a low coefficient of linear expansion, and high dimensional stability. Therefore, the molded product can be used for various applications such as a material that is suitable for use as the exterior panels of automobiles or as a sheet metal replacement material.

DESCRIPTION OF EMBODIMENTS

Hereinafter examples of the present invention will be described. It should be appreciated, however, that the present invention is not limited to these examples.

EXAMPLE 1

100 parts by weight of maleic anhydride-modified polypropylene-based resin ("ADMER QE800" (trade name) available from Mitsui Chemicals, Inc., melt flow rate: 9.2 g/10 min., melting point: 140° C., acid value: 4.3, weight average molecular weight: 100,000) and 5 parts by weight of flaked graphite ("XGnP-5" (trade name) available from XG SCIENCE, mean size in the plane direction of graphene sheet: 5 μm, number of layers: 180, oxygen content: 3.9 atm %, carbon content: 96.1 atm %) were supplied to an extruder, and melted and kneaded to produce a polyolefin-based resin composition. The polyolefin-based resin composition was extruded through a T-die connected to the tip of the extruder to obtain a polyolefin-based resin sheet with a thickness of 0.5 mm.

EXAMPLE 2

0.25 g of powdered single crystal graphite was added to 11.5 mL of concentrated sulfuric acid and the mixture was cooled in a water bath at 10° C. with stirring. 1.5 g of potassium permanganate was gradually added to the concentrated sulfuric acid, while stirring, and the mixture was reacted at 35° C. for 30 minutes.

23 g of water was gradually added to the concentrated sulfuric acid to react at 98° C. for 15 minutes. Then, 70 g of water and 4.5 g of water comprising 30% by weight of hydrogen peroxide were added to the concentrated sulfuric acid to stop the reaction. The resulting graphite oxide was centrifuged at a rotational speed of 14,000 rpm for 30 minutes, rinsed sufficiently with 5% by weight dilute hydrochloric acid and water, and dried. The resultant graphite oxide was dispersed in water so that the concentration was 0.2 mg/mL. The graphite oxide was irradiated with an ultrasonic wave by an ultrasonic wave washing machine at 45 kHz and 100 W for 60 minutes, and flaked off the graphene sheets from the graphite oxide. Thus, flaked graphite was obtained by oxidation of graphene sheets. Hydrazine was added to the flaked graphite that was prepared by oxidation of the obtained graphene sheets and a reduction was performed for 10 minutes in order to reduce the flaked graphite. The mean size of the obtained flaked graphite in the plane direction of the graphene sheets was 5 μm, the number of layers was 60, the oxygen content was 10 atm %, and the carbon content was 90 atm %.

100 parts by weight of polypropylene ("J-721GR" (trade name) available from Prime Polymer Co., Ltd., modulus of elongation: 1.2 GPa, coefficient of linear expansion: 11× $10^{-5}$/K), 5 parts by weight of maleic acid-modified polypropylene-based resin ("Umex 1010" (trade name) available from Sanyo Chemical Industries, Ltd., acid value: 52, weight average molecular weight: 30,000), and 5 parts by weight of the above-described flaked graphite were supplied to an extruder, and melted and kneaded to produce a polyolefin-based resin composition. The polyolefin-based resin composition was extruded through a T-die connected to the tip of the extruder to obtain a polyolefin-based resin sheet with a thickness of 0.5 mm.

EXAMPLE 3

A polyolefin-based resin sheet with a thickness of 0.5 mm was obtained in the same manner as in Example 2 except that 5 parts by weight of maleic acid-modified polypropylene-based resin which is commercially available as "Umex 1001" (trade name) from Sanyo Chemical Industries, Ltd. (acid value: 26, weight average molecular weight: 40,000) was used.

EXAMPLE 4

A polyolefin-based resin sheet with a thickness of 0.5 mm was obtained in the same manner as in Example 2 except that hydrazine was added to the flaked graphite which was prepared by oxidation of graphene sheets for production of the flaked graphite and reduction was performed for 3 minutes. The mean size of the obtained flaked graphite in the plane direction of the graphene sheets was 5 μm, the number of layers was 60, the oxygen content was 36 atm %, and the carbon content was 64 atm %.

EXAMPLE 5

A polyolefin-based resin sheet with a thickness of 0.5 mm was obtained in the same manner as in Example 2 except that 5 parts by weight of polyolefin-based resin with a hydroxyl group ("POLYTAIL H" (trade name) available from Mitsubishi Chemical Corporation, hydrogenated polybutadienediol, hydroxyl value: 45, weight average molecular weight: 2,350) was used instead of the acid-modified polyolefin-based resin.

EXAMPLE 6

A polyolefin-based resin sheet with a thickness of 0.5 mm was obtained in the same manner as in Example 2 except that 5 parts by weight of styrene-ethylene/propylene-styrene block copolymer ("SEPTON SEPS 2063" (trade name) available from Kuraray Co., Ltd., content of styrene component: 13% by weight) as the compound with a six-membered ring relative to 100 parts by weight of polypropylene was supplied to the extruder.

COMPARATIVE EXAMPLE 1

A polyolefin-based resin sheet with a thickness of 0.5 mm was obtained in the same manner as in Example 2 except that the acid-modified polyolefin-based resin was not used. The flaked graphite noticeably aggregated in the polyolefin-based resin sheet.

The moduli of elongation and coefficients of linear expansion of the obtained polyolefin-based resin sheets were measured as described below, and the results are shown in Table 1.

(Modulus of Elongation)
A rectangular test piece with a length of 70 mm and a width of 6.0 mm was cut from the obtained polyolefin-based resin sheet, and the modulus of elongation of the test piece was measured in accordance with JIS K7161.

(Coefficient of Linear Expansion)
A rectangular parallelepiped-shaped test piece with a length of 5 mm, a width of 5 mm, and a height of 10 mm was cut from the obtained polyolefin-based resin sheet, and the coefficient of linear expansion of the test piece was measured in accordance with JIS K7197.

TABLE 1

|  | EXAMPLE 1 | EXAMPLE 2 | EXAMPLE 3 | EXAMPLE 4 | EXAMPLE 5 | EXAMPLE 6 | COMPARATIVE EXAMPLE 1 |
|---|---|---|---|---|---|---|---|
| MODULUS OF ELONGATION (GPa) | 4.0 | 4.3 | 3.8 | 4.0 | 4.1 | 6.6 | 1.8 |
| COEFFICIENT OF LINEAR EXPANSION ($10^{-5}$/K) | 6.0 | 6.0 | 5.8 | 6.7 | 6.2 | 4.4 | 9.0 |

INDUSTRIAL APPLICABILITY

The polyolefin-based resin composition of the present invention can be molded into a desired shape using general molding methods and a molded product having the desired shape can be obtained easily. The molded product has excellent mechanical strength such as a high modulus of elongation, a low coefficient of linear expansion, and high dimensional stability. Therefore, the molded product can be used for various applications such as a material that is suitable for use as the exterior panels of automobiles or a steel sheet replacement material.

The invention claimed is:
1. A polyolefin-based resin composition, comprising a polyolefin-based resin containing an acid-modified polyolefin-based resin having an acid value of 4.3 to 52 measured in accordance with JIS K0070 and a polyolefin-based resin with a hydroxyl group, and flaked graphite having a number of layers of a graphene sheet of 60 to 300,
wherein a total content of the acid-modified polyolefin-based resin and the polyolefin-based resin with a hydroxyl group in the polyolefin-based resin is 1 to 100% by weight, wherein the polyolefin-based resin composition does not comprise a fibrous filler, and wherein the flaked graphite has an oxygen content of 3 atm % or more.

2. The polyolefin-based resin composition according to claim 1, wherein the flaked graphite has an oxygen content of 10 atm % or more.

3. The polyolefin-based resin composition according to claim 1, wherein the acid-modified polyolefin-based resin is an unsaturated carboxylic acid-modified polyolefin-based resin.

4. The polyolefin-based resin composition according to claim 3, wherein the unsaturated carboxylic acid-modified polyolefin-based resin is a maleic acid-modified polyolefin-based resin.

5. The polyolefin-based resin composition according to claim 4, wherein the maleic acid-modified polyolefin-based resin is a maleic anhydride-modified polyolefin-based resin.

6. The polyolefin-based resin composition according to claim 1, including 100 parts by weight of the polyolefin-based resin and 0.5 to 50 parts by weight of the flaked graphite.

* * * * *